(12) United States Patent
Anthes et al.

(10) Patent No.: US 7,628,360 B2
(45) Date of Patent: Dec. 8, 2009

(54) STAND WITH A SECURING DEVICE

(75) Inventors: Peter Anthes, Erbach (DE); Frank Kellner, Bad Hersfeld (DE); Werner Sagawe, Lauterbach (DE)

(73) Assignee: Ondal Holding GmbH, Hunfeld (DE)

( * ) Notice: Subject to any disclaimer, the term of this patent is extended or adjusted under 35 U.S.C. 154(b) by 186 days.

(21) Appl. No.: 11/601,253

(22) Filed: Nov. 17, 2006

(65) Prior Publication Data
US 2007/0205339 A1 Sep. 6, 2007

(30) Foreign Application Priority Data
Nov. 25, 2005 (EP) .................................. 05025741

(51) Int. Cl.
A47F 5/00 (2006.01)
A47F 7/00 (2006.01)
F16M 11/00 (2006.01)
F16M 13/00 (2006.01)

(52) U.S. Cl. .................... 248/125.8; 248/690; 248/161; 248/129; 248/159; 248/218.4; 248/303; 403/329

(58) Field of Classification Search ................. 248/690, 248/161, 129, 159, 125.8, 218.4, 303
See application file for complete search history.

(56) References Cited

U.S. PATENT DOCUMENTS

| 1,261,755 | A | * | 4/1918 | Beyle | 248/125.8 |
| 1,405,287 | A | * | 1/1922 | Clifford | 248/161 |
| 1,796,384 | A | * | 3/1931 | McElroy | 34/60 |
| 1,853,606 | A | * | 4/1932 | Davis | 34/99 |
| 1,977,313 | A | * | 10/1934 | Koken | 297/411.45 |
| 4,247,216 | A | * | 1/1981 | Pansini | 403/109.3 |
| 4,725,027 | A | * | 2/1988 | Bekanich | 248/125.8 |
| 4,744,536 | A | * | 5/1988 | Bancalari | 248/125.8 |
| 4,892,279 | A | * | 1/1990 | Lafferty et al. | 248/125.8 |
| 4,905,944 | A | * | 3/1990 | Jost et al. | 248/125.8 |
| 5,078,349 | A | * | 1/1992 | Smith | 248/125.8 |
| 5,125,607 | A | * | 6/1992 | Pryor | 248/125.1 |

(Continued)

FOREIGN PATENT DOCUMENTS

DE 4321726 A1 1/1995

Primary Examiner—J. Allen Shriver, II
Assistant Examiner—Michael McDuffie
(74) Attorney, Agent, or Firm—Seed IP Law Group PLLC

(57) ABSTRACT

Stand (1) with a foot (2) and a stand tube (3) which is arranged perpendicularly thereto and at the upper end (4) has a manually operable securing device (5) for securing, by means of a connecting pin (7), an appliance (6) which is connected to the stand tube (3) against being unintentionally released. The securing device (5) is designed as an essentially U-shaped wire clip (8,8.1) which is bent in one piece and has two resilient limbs (9,10), a subregion (11,12) of the limbs (9,10) engaging resiliently in each case in a corresponding groove (13,14) of the connecting pin (7). A curved region (15) of the wire clip (8,8.1) is arranged outside the stand tube (3). The advantage of the wire clip (8) resides in the cost-effective production, the installation of the particular hairdressing appliance (6) without a tool, and the secure locking (protection against unintentional raising/pulling out) of the hairdressing appliance (6) by the wire clip (8), and the removal of the hairdressing appliance (6), again without a tool (FIG. 1).

16 Claims, 8 Drawing Sheets

U.S. PATENT DOCUMENTS

| | | | |
|---|---|---|---|
| 5,135,191 A * | 8/1992 | Schmuhl | 248/125.1 |
| 5,288,093 A * | 2/1994 | Gross | 280/292 |
| 5,421,548 A * | 6/1995 | Bennett et al. | 248/129 |
| 5,470,037 A * | 11/1995 | Willis | 248/125.9 |
| 5,593,122 A * | 1/1997 | Robertson et al. | 248/222.12 |
| 5,651,521 A * | 7/1997 | Aberg | 248/218.4 |
| 5,772,162 A * | 6/1998 | Lin | 248/121 |
| 6,079,678 A * | 6/2000 | Schott et al. | 248/229.15 |
| 6,190,082 B1 * | 2/2001 | Butterfield | 403/325 |
| 6,199,805 B1 * | 3/2001 | Pena | 248/125.8 |
| 6,224,027 B1 * | 5/2001 | Johnson et al. | 248/125.8 |

* cited by examiner

STAND WITH A SECURING DEVICE

The invention relates to a stand for supporting and holding large appliances.

Stands of this type are known in a multiplicity of exemplary embodiments, such as, for example, from German Patent Application No. 4,321,726 A1. Two additional parts, namely a clamping element and a securing sleeve, are provided here as the securing device.

The invention is based on the object of providing a securing device which is similar to the generic type, is simpler in construction and can therefore be produced more cost-effectively. A secondary object is to provide a securing device which is similar to the generic type and, by means of extremely simple measures, has a further usable function. By means of extremely simple measures, a further usable function in the form of a securing means for a power supply cord is provided.

The invention is described in more detail with reference to two exemplary embodiments.

In the drawing:

FIGS. 1 to 6 show a first exemplary embodiment:

Figure 1:
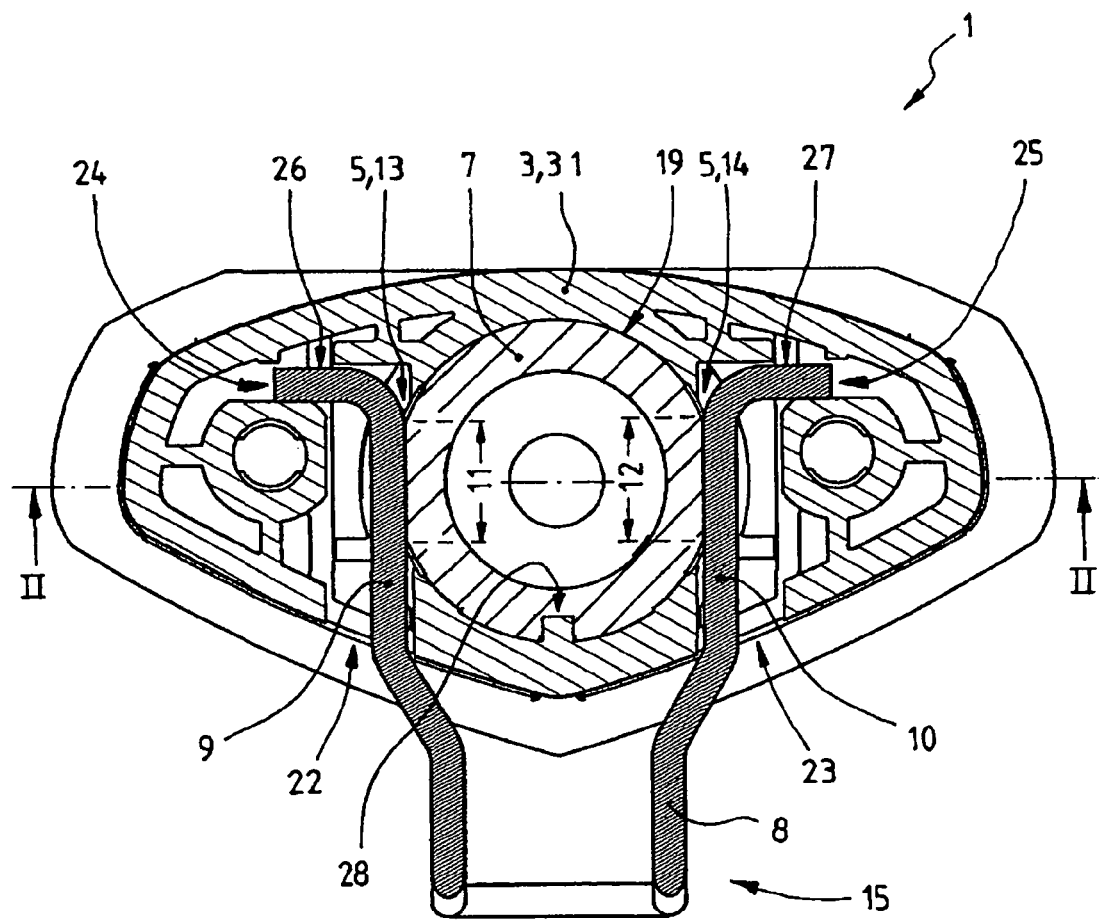
FIG. 1 shows, in a section I-I according to FIG. 6, a first exemplary embodiment of a securing device.
Figure 2:
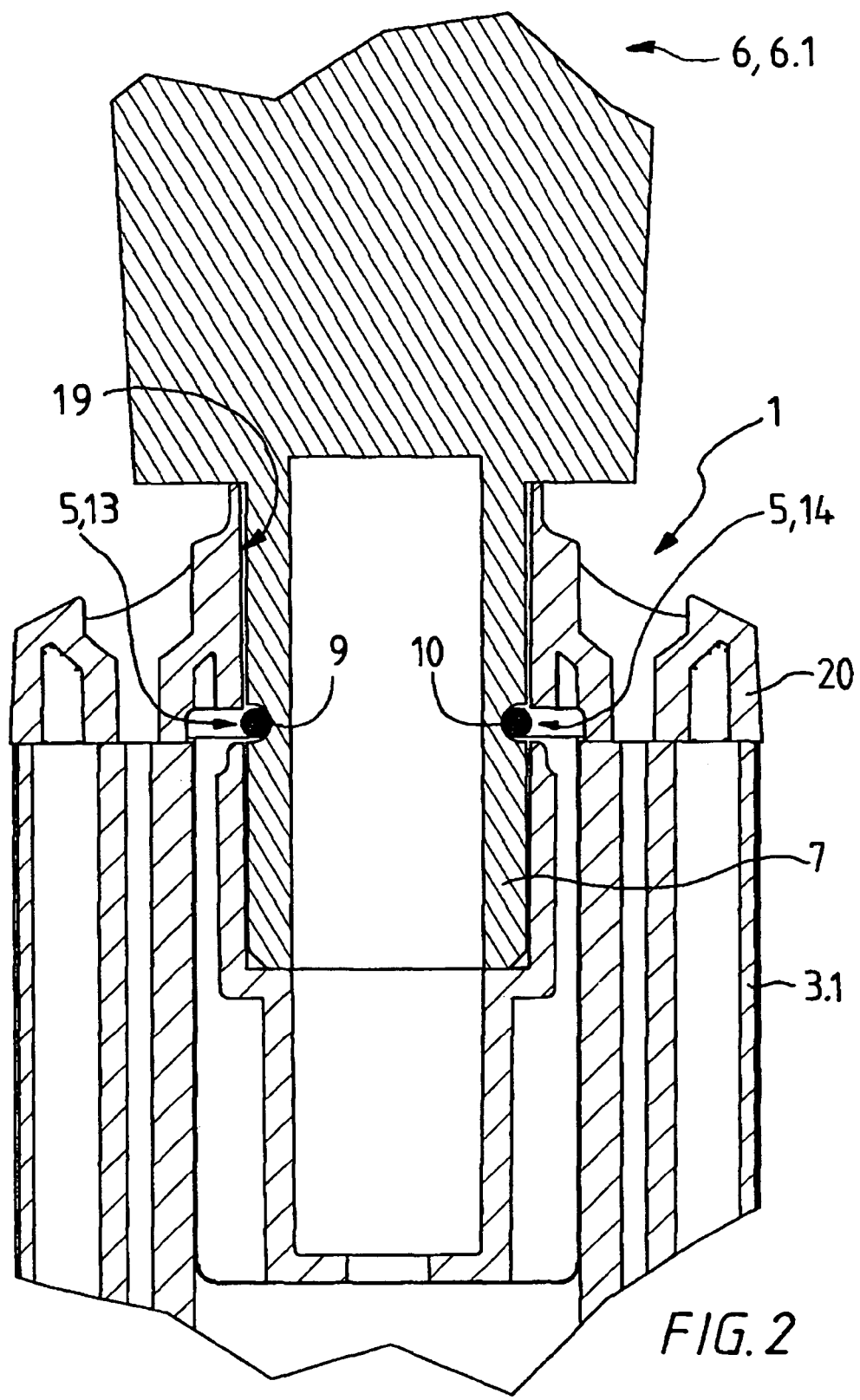
FIG. 2 shows, in a section II-II according to FIG. 1, the securing device according to FIG. 1.

FIGS. 1 and 2 show a stand 1 with a foot 2 and a stand tube 3 which is arranged perpendicularly thereto and at the upper end 4 has a manually operable securing device 5 for securing, by means of a connecting pin 7, an appliance 6 (FIG. 2) which is connected to the stand tube 3 against being unintentionally released. The securing device 5 is designed as an essentially U-shaped wire clip 8 which is bent in one piece and has two resilient limbs 9,10, a subregion 11,12 of the limbs 9,10 engaging resiliently in each case in a corresponding groove 13,14 of the connecting pin 7 and therefore, as securing device 5, locking the connecting pin 7. A curved region 15 of the wire clip 8 is arranged outside the stand tube 3, as a result of which, for the purpose of canceling the locking, a manual spreading of the limbs 9,10 is possible without a tool. The manual spreading of the limbs 9,10 makes possible a respective slot 22,23 and a respective guide 24,25 for the bent limb ends 26,27. An axial rotation of the connecting pin 7 in a pin receptacle 19 is prevented, for example, by means of a tongue and groove as means of securing against rotation 28.

Figure 3:
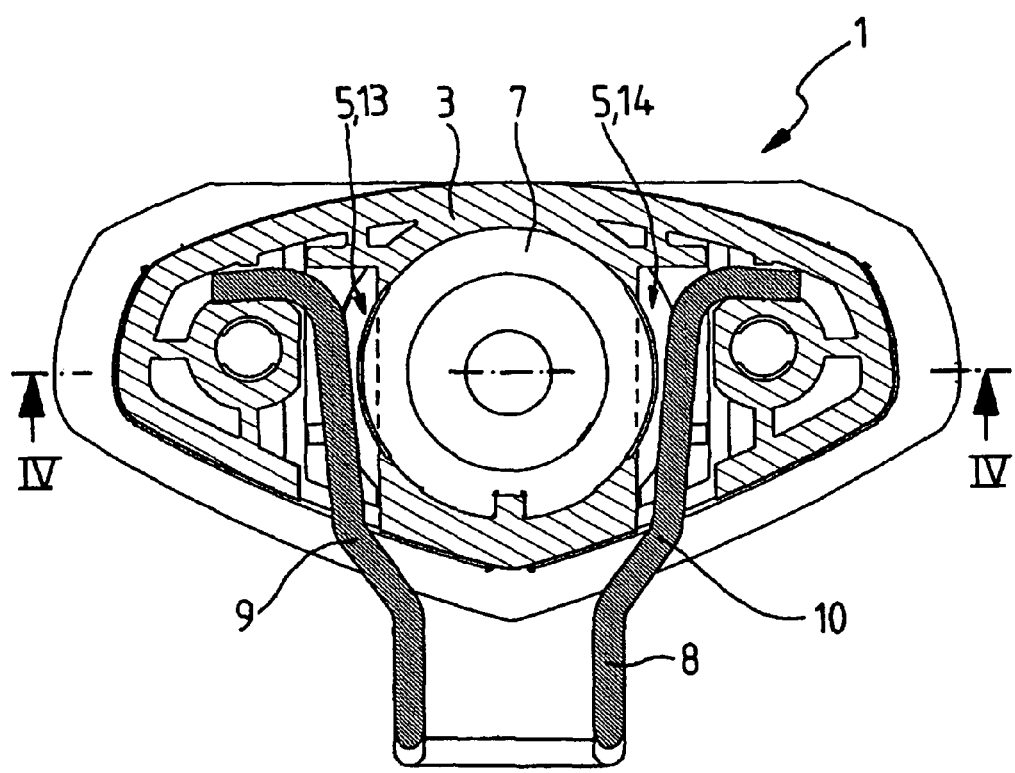
FIG. 3 shows FIG. 1, but with a wire clip pressed manually apart for release purposes.
Figure 4:
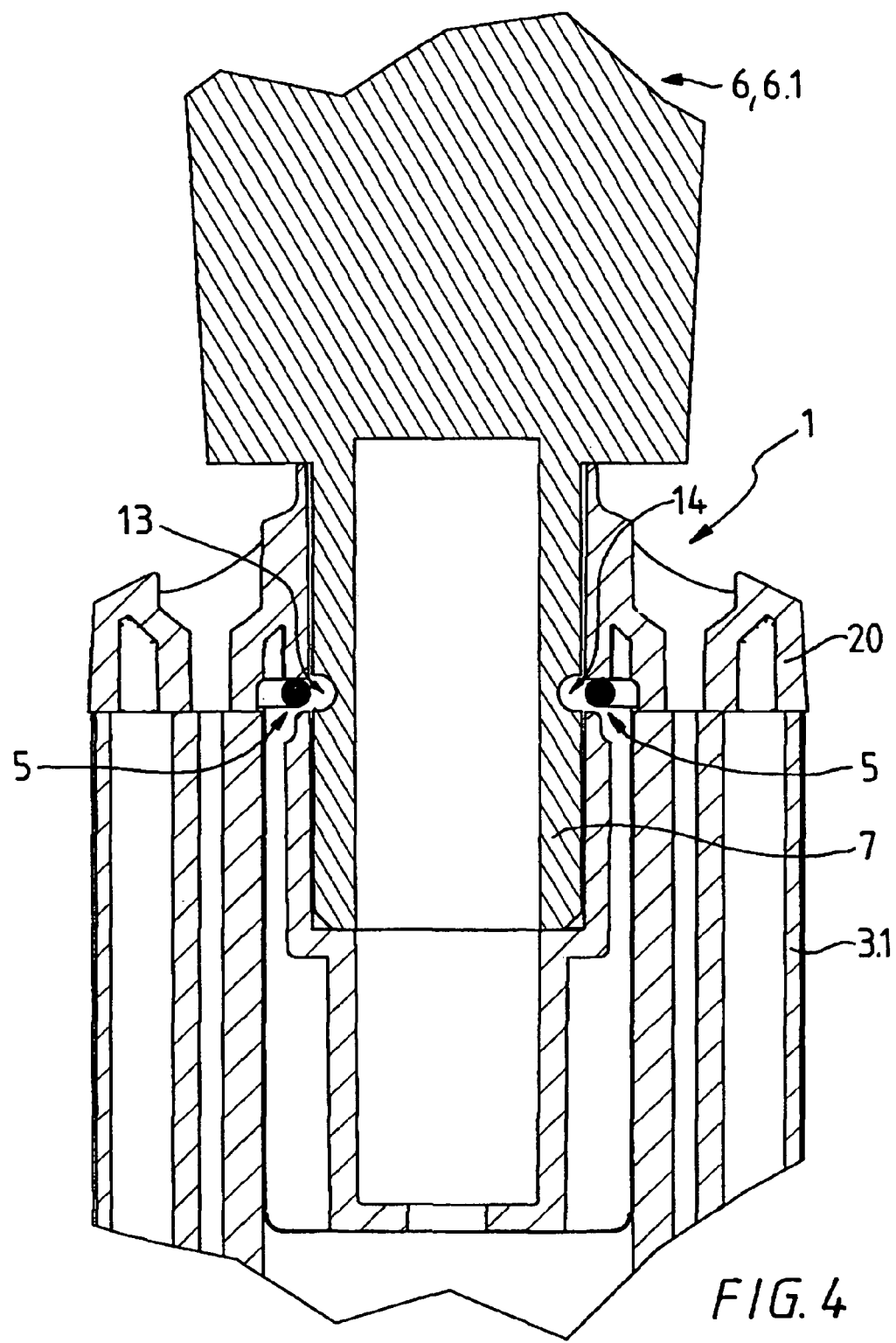
FIG. 4 shows FIG. 2, but with a wire clip pressed manually apart for release purposes.

FIGS. 3 and 4 show the stand 1 according to FIGS. 1 and 2 but with a wire clip 8 pressed manually apart (spread) in order to release the connecting pin 7 for the purpose of removing the appliance 6. As a result, the first and the second subregions 11,12 of the first and second limbs 9,10 are situated outside the first and second grooves 13,14, thus enabling the connecting pin 7 to be pulled out of the pin receptacle 19.

Figure 5:
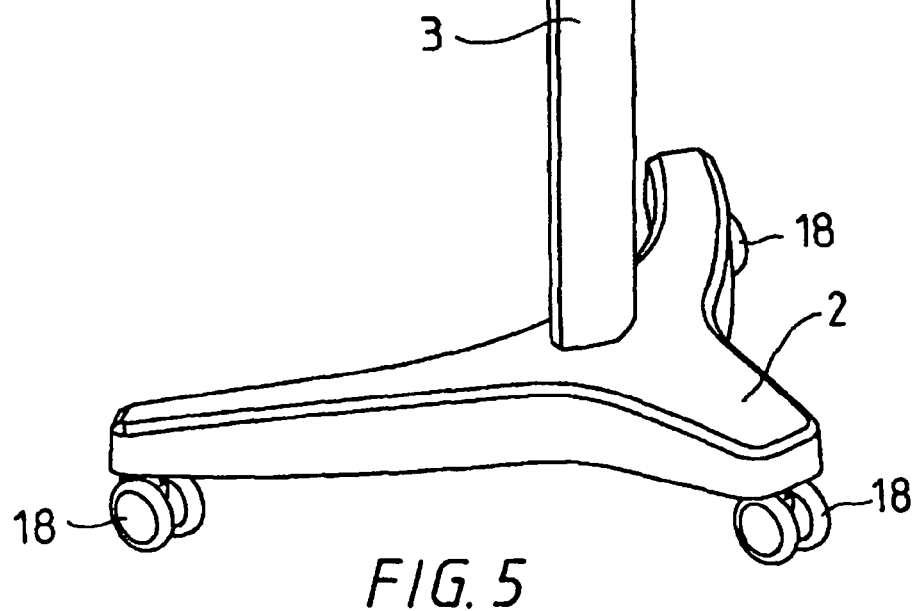
FIG. 5 shows, in a perspective view, a complete stand, but without a supporting appliance.

FIG. 5 shows, in a perspective view, a complete stand 1, but without a supporting appliance 6.

Figure 6:
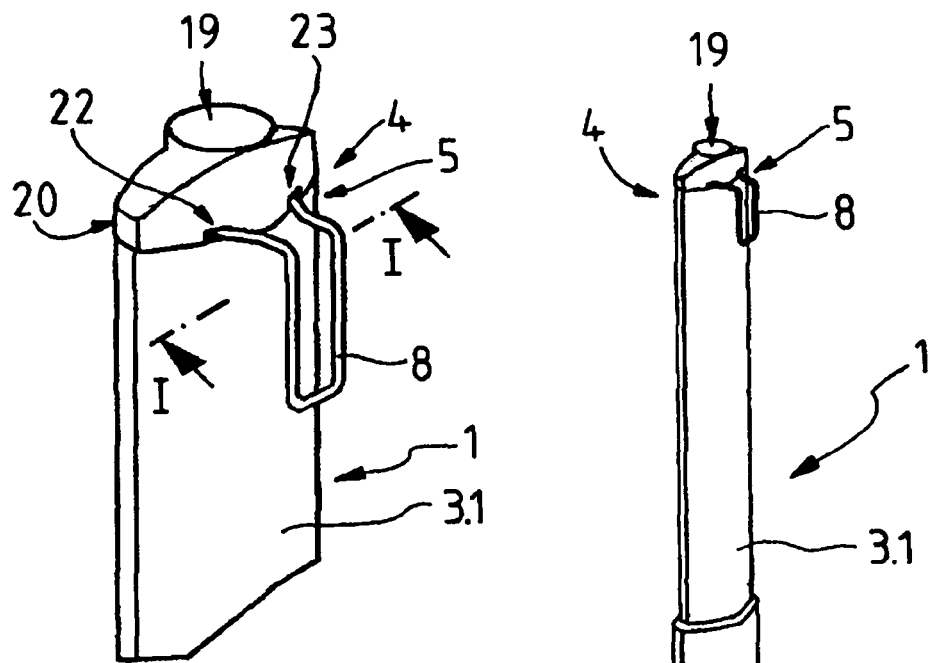
FIG. 6 shows, in an enlarged illustration, an upper part of the stand according to FIG. 5.

FIG. 6 shows, in an enlarged illustration, an upper part of the stand 1 according to FIG. 5. The section II-II according to FIG. 6 is illustrated in FIG. 2.

The advantage of the wire clip 8 resides in the cost-effective production, the installation of the particular hairdressing appliance 6.1 without a tool, and the secure locking (protection against unintentional raising/pulling out) of the hairdressing appliance 6.1 by the wire clip 8, and the removal of the hairdressing appliance 6.1, again without a tool.

Figure 8:
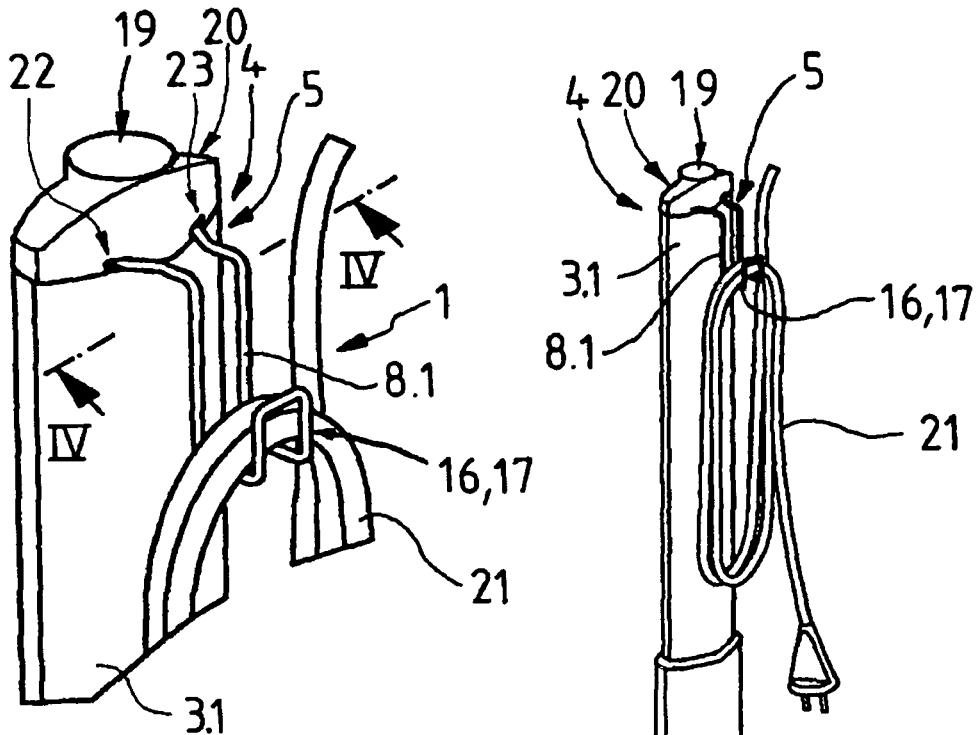
FIGS. 7,8 show FIGS. 5 and 6, but show the wire clip as a hook for holding a power supply cord.
Figure 7:
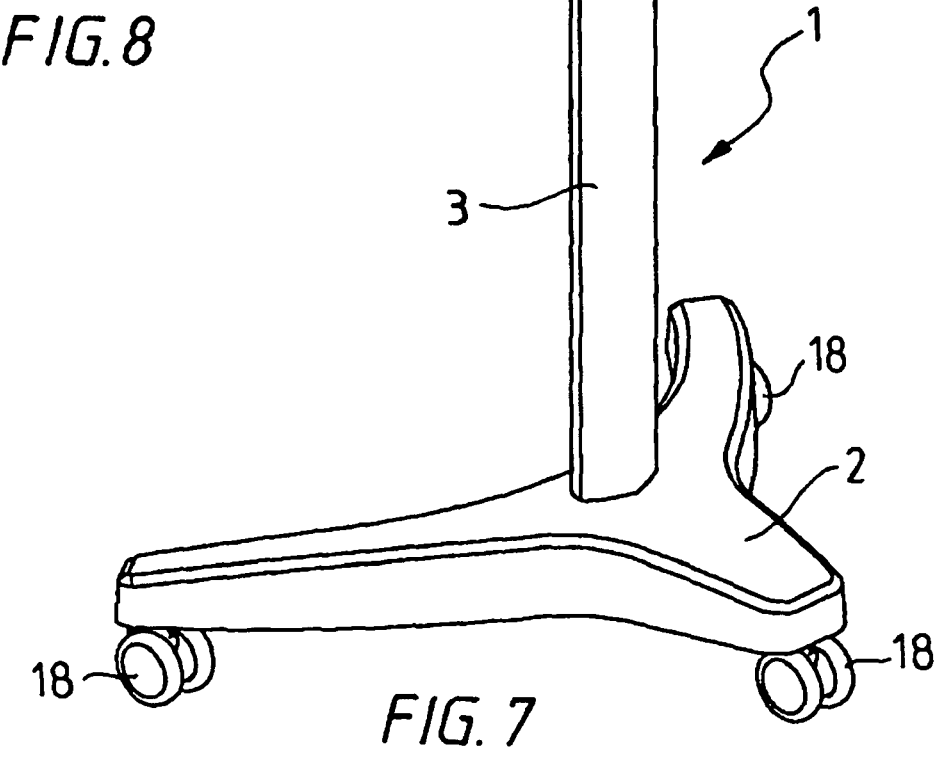

FIGS. 7 to 10 show a second exemplary embodiment:

FIGS. 7 and 8 show FIGS. 5 and 6, but with a correspondingly bent wire clip 8.1 as a hook 16 for holding a power supply cord 21, as a result of which, by means of an extremely simple measure, the securing device 5 or the wire clip 8.1 has a further useful function. The section IV-IV according to FIG. 8 is illustrated in FIG. 4.

Figure 9:
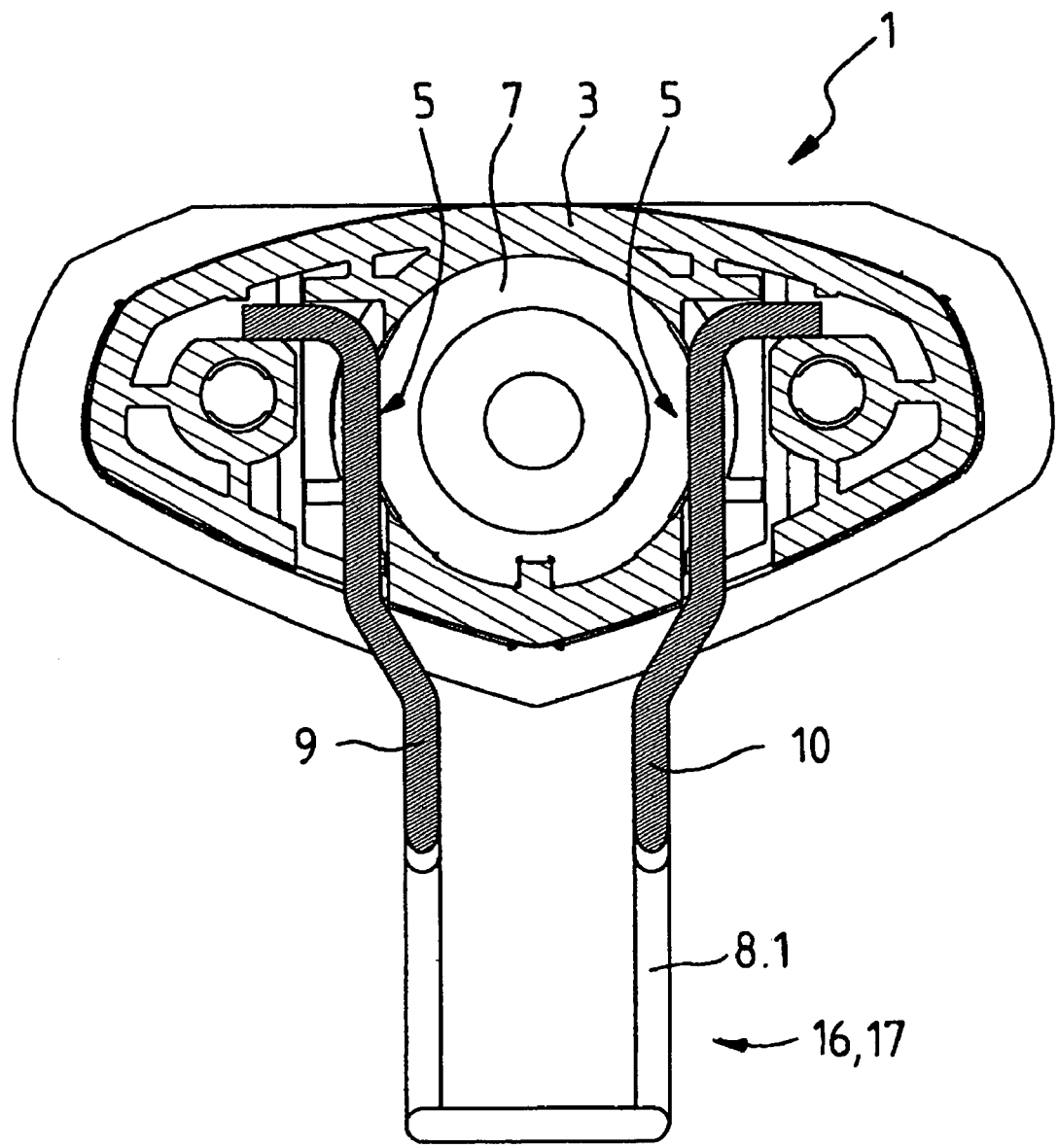
FIGS. 9,10 show FIGS. 1 and 3, but show the wire clip as a hook for holding a power supply cord.
Figure 10:
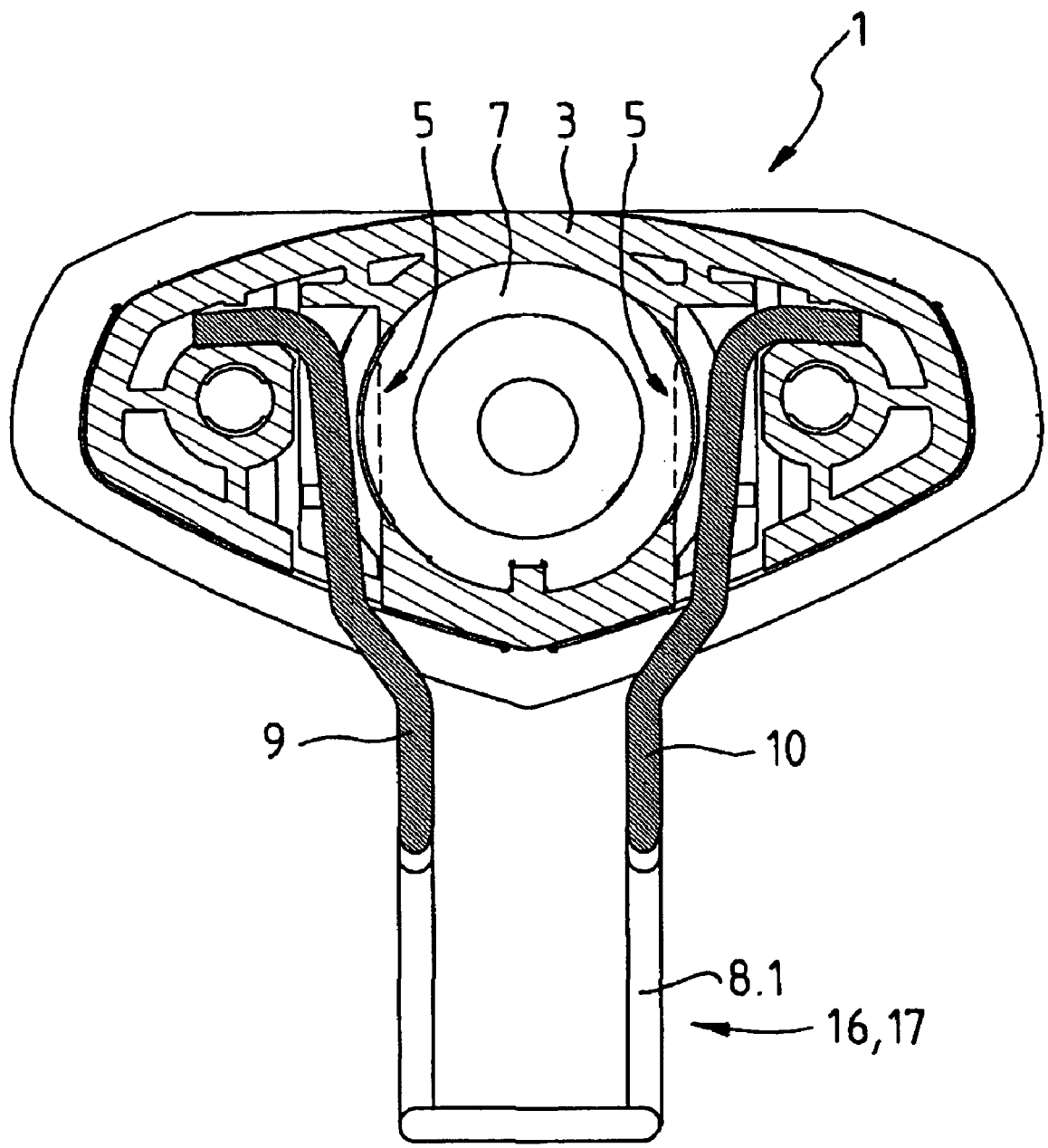

FIGS. 9 and 10 show FIGS. 1 and 3, but with a wire clip 8.1 as a hook 16 for holding a power supply cord 21.

The stand 1 is preferably provided for holding or supporting large hairdressing appliances 6.1—such as, for example, dryers. The appliances 6 can therefore be moved in the X-Y direction (by means of castors 18 on the foot 2) and can be adjusted in height in the Z-direction.

The stand 1 essentially comprises the stand tube 3 with a pin receptacle 19 for the connecting pin 7 for connecting the appliance 6 to the stand 1 and to the stand foot 2 having three castors 18.

The stand tube 3 comprises a fixed, lower profile tube and a telescopically movable, upper profile tube, on the upper end of which sits a plastic head part 20 with an integrated wire clip 8 made from spring steel 6.

The appliance 6 is operated with mains voltage which is supplied externally via a customary power supply cord 21. If the appliance 6 is not in operation and is separated from the mains, the power supply cord 21 can be held neatly in a number of loops on the wire clip 8.1 (FIGS. 7 to 10). As a result, dragging on the floor, catching on edges/in corners and therefore damage to the power supply cord 21 are avoided.

In addition, the wire clip 8,8.1 is guided in the head part 20 in such a manner that, in a relaxed state (also see FIG. 9), it conceals part of the pin receptacle 19. If the hairdressing appliance 6 (with corresponding connecting pin 7) is introduced into the pin receptacle 19, the wire clip 8,8.1 automatically expands via the dead weight of the hairdressing appliance 6 and then snaps with the first and second subregions 11,12 of the limbs 9,10 into the first and second grooves 13,14. The appliance 6 is now secured against being unintentionally released from the stand tube 3.

In order to separate the hairdressing appliance 6.1 again from the stand 1, the hairdressing appliance 6.1 is raised with one hand of the operator and the wire clip 8,8.1 on the head part 20 (FIG. 10) is widened with the other hand. As a result, the entire cross section of the pin receptacle 19 becomes free and the hairdressing appliance 6.1 can be released in a specific manner from its locking.

The advantage of the wire clip 8.1 resides in the securing of the power supply cord 21 of the hairdressing appliance 6.1 by the hook 16, the cost-effective production, the installation of the particular hairdressing appliance 6.1 without a tool, and the secure locking (protection against unintentional raising/ pulling out) of the hairdressing appliance 6.1 by the wire clip 8.1, and the removal of the hairdressing appliance 6.1, again without a tool.

LIST OF REFERENCE NUMBERS

1 Stand
2 Foot
3 Stand tube
3.1 Telescopic stand tube
4 Upper end
5 Securing device
6 Appliance
6.1 Hairdressing appliance
7 Connecting pin
8 Wire clip
8.1 Wire clip with hook 16
9 First limb
10 Second limb
11 First subregion
12 Second subregion
13 First groove
14 Second groove
15 Curved region
16 Hook
17 Securing means for the power supply cord
18 Castor
19 Pin receptacle
20 Head part
21 Power supply cord
22 First slot
23 Second slot
24 First guide
25 Second guide
26 First limb end
27 Second limb end
28 Means of securing against rotation The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A stand comprising a foot and a stand tube which is arranged perpendicularly thereto and at the upper end comprises a manually operable securing device for securing an appliance to the stand tube, by means of a connecting pin of the appliance which is inserted into a hollow interior of the stand tube at the upper end thereof, wherein the securing device is designed as a wire clip which is bent in one piece and comprises two resilient limbs, a subregion of the limbs engaging resiliently in each case in a corresponding groove of the connecting pin of the appliance when the connecting pin is inserted into the hollow interior of the stand tube, and wherein a curved region of the wire clip is arranged outside the stand tube.

2. A stand according to claim 1, wherein the wire clip outside the stand tube is designed as a hook.

3. A stand according to claim 1, wherein the wire clip outside the stand tube is designed as a hook and is provided as a securing means for the power supply cord.

4. A stand according to claim 1, wherein the wire clip is produced from spring steel wire.

5. A stand according to claim 1, wherein the stand tube is of telescopically adjustable design.

6. A stand according to claim 1, wherein a hairdressing appliance is provided as the appliance.

7. A stand according to claim 1, wherein the foot is provided with castors.

8. A stand for holding an appliance, comprising:
an elongated stand member having a proximate portion and a distal portion;
at least one foot coupled to the distal portion of the elongated stand member;
a clip arranged at the proximate portion of the elongated stand member, the clip comprising two resilient arm members joined by a central portion,
wherein a connecting pin of the appliance is adapted to be inserted into a hollow interior of the elongated stand member at the proximate portion thereof,
wherein part of the arm members of the clip are adapted to resiliently engage in a corresponding groove of the connecting pin when the connecting pin is inserted into the hollow interior of the elongated stand member, and
wherein the central portion of the clip is arranged outside the elongated stand member.

9. A stand according to claim 8, wherein the part of the arm members of the clip adapted to resiliently engage in the corresponding groove of the connecting pin is within the interior of the elongated stand member at the proximate portion thereof.

10. A stand according to claim 8, wherein the elongated stand member is a tube.

11. A stand according to claim 8, wherein the part of the arm portions configured to be resiliently engaged in the groove of the connecting pin are adapted to be removed from the groove by manually spreading the resilient arm portions.

12. A stand according to claim 8, wherein the central portion of the clip arranged outside the elongated stand member comprises a hook and is provided as a securing means for a power supply cord.

13. A stand according to claim 8, wherein the elongated stand member is configured to be telescopically adjustable.

14. A stand according to claim 8, wherein the clip is a contiguous piece of steel wire.

15. In combination, a stand as defined in claim 1, and an appliance having a connecting pin which is adapted to be inserted into an upper end of the stand tube, wherein the connecting pin includes a groove in which a subregion of the limbs of the clip are adapted to resiliently engage.

16. In combination, a stand as defined in claim 8, and an appliance having a connecting pin which is adapted to be inserted into a proximal end of the elongated stand member, wherein the connecting pin includes a groove in which part of the arm members of the clip are adapted to resiliently engage.

* * * * *